(12) United States Patent
Belle et al.

(10) Patent No.: US 11,220,178 B2
(45) Date of Patent: Jan. 11, 2022

(54) VEHICLE SPEED REGULATION INCORPORATING DRIVER WISHES UNDER CORNERING

(71) Applicant: PSA AUTOMOBILES SA, Poissy (FR)

(72) Inventors: Claire Belle, Seloncourt (FR); Fabrice Perrot, Igny (FR); Eric Favreau, Masevaux (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 17/290,964

(22) PCT Filed: Oct. 23, 2019

(86) PCT No.: PCT/FR2019/052527
§ 371 (c)(1),
(2) Date: May 3, 2021

(87) PCT Pub. No.: WO2020/099748
PCT Pub. Date: May 22, 2020

(65) Prior Publication Data
US 2021/0309105 A1    Oct. 7, 2021

(30) Foreign Application Priority Data
Nov. 16, 2018 (FR) ...................................... 1871558

(51) Int. Cl.
*B60K 31/00* (2006.01)
*B60W 30/00* (2006.01)
(Continued)

(52) U.S. Cl.
CPC ....... *B60K 31/0066* (2013.01); *B60W 30/143* (2013.01); *B60W 30/18145* (2013.01);
(Continued)

(58) Field of Classification Search
None
See application file for complete search history.

(56) References Cited

U.S. PATENT DOCUMENTS

| | | |
|---|---|---|
| 2007/0208485 A1 | 9/2007 | Yamamura et al. |
| 2012/0316746 A1* | 12/2012 | Park .................. G08G 1/09626 701/93 |

(Continued)

FOREIGN PATENT DOCUMENTS

EP    2168806 A2    3/2010

OTHER PUBLICATIONS

International Search Report for PCT/FR2019/052527 dated Feb. 21, 2020.
Written Opinion for PCT/FR2019/052527 dated Feb. 21, 2020.

*Primary Examiner* — Jonathan M Dager
(74) *Attorney, Agent, or Firm* — Sandberg Phoenix & von Gontard PC

(57) ABSTRACT

A method is intended to regulate the speed of an at least partially self-driving vehicle, knowing the radius of curvature of a future position it is preparing to take on a course along which it is travelling. This method comprises a step (10-90) in which the speed is regulated as a function of a speed set point and, if a radius of curvature of the future position which is representative of a curve is detected, a phase of deceleration down to a chosen speed followed by a phase of acceleration until the speed setpoint is obtained are imposed on the vehicle. In this step (10-90), when the driver imposes acceleration on his vehicle during the deceleration phase, this deceleration phase is halted and then another phase of acceleration until the speed set point is obtained is imposed on the vehicle.

11 Claims, 2 Drawing Sheets

(51) Int. Cl.
*B60W 30/14* (2006.01)
*B60W 50/00* (2006.01)
*B60W 30/18* (2012.01)

(52) U.S. Cl.
CPC ... *B60W 50/0097* (2013.01); *B60W 2520/105* (2013.01); *B60W 2540/10* (2013.01); *B60W 2540/215* (2020.02); *B60W 2552/30* (2020.02); *B60W 2720/103* (2013.01)

(56) References Cited

U.S. PATENT DOCUMENTS

| | | | |
|---|---|---|---|
| 2015/0151725 A1* | 6/2015 | Clarke | B60W 10/18 |
| | | | 701/28 |
| 2016/0052547 A1* | 2/2016 | Kashiwai | B60W 40/076 |
| | | | 701/41 |
| 2016/0362106 A1* | 12/2016 | Maeda | B60W 30/18145 |
| 2018/0037223 A1* | 2/2018 | Goto | G05D 1/0231 |
| 2018/0201318 A1* | 7/2018 | Kataoka | B62D 15/025 |
| 2018/0345953 A1* | 12/2018 | Mizoguchi | B60W 30/18145 |
| 2019/0061811 A1* | 2/2019 | Odate | B62D 15/025 |
| 2019/0071093 A1* | 3/2019 | Ma | G08G 1/167 |
| 2019/0225223 A1* | 7/2019 | Feron | G08G 1/167 |
| 2019/0227563 A1* | 7/2019 | Shimakage | B62D 15/025 |
| 2019/0232965 A1* | 8/2019 | Watanabe | B60W 50/0097 |
| 2019/0232970 A1* | 8/2019 | Watanabe | B60W 40/107 |
| 2020/0385007 A1* | 12/2020 | Bucht | B60W 40/09 |
| 2020/0406969 A1* | 12/2020 | Ersal | B60W 30/18163 |
| 2021/0094577 A1* | 4/2021 | Shalev-Shwartz | B60W 30/181 |
| 2021/0123750 A1* | 4/2021 | Im | G01C 21/3676 |

\* cited by examiner

VEHICLE SPEED REGULATION INCORPORATING DRIVER WISHES UNDER CORNERING

CROSS-REFERENCE TO RELATED APPLICATIONS

This application is the US National Stage under 35 USC § 371 of International Application No. PCT/FR2019/052527, filed 23 Oct. 2019 which claims priority to French Application No. 1871558 filed 16 Nov. 2018, both of which are incorporated herein by reference.

TECHNICAL FIELD OF THE INVENTION

The invention relates to at least partially self-driving vehicles, and more precisely to the regulation of the speed of such vehicles.

BACKGROUND

In what follows, a vehicle is considered to be at least partially self-driving (or autonomous) when it can be driven in a (partially or totally) automated manner (without intervention of the driver) during a self-driving phase, or manually (and therefore with intervention by the driver on the steering wheel and/or the pedals) during a manual driving phase.

Some at least partially self-driving vehicles comprise a regulation device responsible for regulating their speed as a function of a speed set point optionally chosen by their driver.

In some cases, this regulation device makes it possible to adapt the speed of the vehicle as a function of the radius of curvature of the future position that the vehicle is preparing to take in the traffic lane along which it is traveling. More precisely, this type of regulation device comprises at least one computer wherein, if a radius of curvature of the taken future position which is representative of a curve is detected, the computer controls the imposition of a deceleration phase on its vehicle down to a chosen speed, followed by an acceleration phase until a speed is obtained which is equal to the speed set point. The acceleration in the acceleration phase depends on the radius of curvature of the section of road in front of the vehicle. It can therefore be limited or not. In the latter case, it is the vehicle speed regulation device which provides control to reach the set point speed. In other words, if an upcoming curve is detected, the speed of the vehicle is temporarily reduced in order to facilitate its passage through this curve and thus to improve passenger comfort.

Currently, when the driver of the vehicle imposes an acceleration on the vehicle during the deceleration phase, for example because he is overtaking another vehicle, the computer temporarily interrupts this deceleration phase, and when the driver of the vehicle stops imposing an acceleration, the computer once again begins to control the imposition of the interrupted deceleration phase, which will then be followed by the aforementioned acceleration phase. Such an operating mode does not incorporate the driver's wishes, namely the desire not to see the speed of his vehicle drop to the speed chosen at the end of the deceleration phase, for example due to the fact that he wishes to continue passing in a curve. In addition, this operating mode may cause a slowing down of the flow of traffic which may appear incomprehensible to at least one of the drivers of the vehicles following the slowed-down vehicle, or may prove dangerous if one of the latter drivers does not notice the slowdown, in particular when the slowdown is too small to generate a signal. In addition, if the speed of the vehicle being controlled is very slightly higher than that of vehicles traveling in the right-hand lane (in the case of driving on the left-hand side), slowing down the vehicle concerned may make its speed lower than that of vehicles traveling in the right-hand lane.

The object of the invention is, in particular, to improve this situation.

SUMMARY

For this purpose, a method is proposed which is intended to regulate the speed of an at least partially self-driving vehicle, when the vehicle knows the radius of curvature of a future position it is preparing to take in a traffic lane along which it is traveling. The method comprises a step in which the speed of the vehicle is regulated as a function of a speed set point and, if a radius of curvature of the future position which is representative of a curve is detected, a phase of deceleration down to a chosen speed followed by an acceleration phase until a speed equal to the speed set point is obtained (possibly adapted according to the speed of another vehicle located in front of the one in question or if there is no new curve) are imposed on the vehicle.

This method is characterized by the fact that, when a driver of the vehicle imposes an acceleration on the vehicle during the deceleration phase, this deceleration phase is halted and then another phase of acceleration is imposed on the vehicle until a speed is obtained which is equal to the speed set point (possibly adapted as a function of the speed of another vehicle located in front of the one in question or if there is no new curve).

Owing to the method, the driver's wishes, namely the desire not to see the speed of his vehicle drop in a curve to the chosen speed at the end of the deceleration phase, is now taken into account.

The method may comprise other features that may be included separately or in combination, and in particular:
- in the method, the other acceleration phase can be imposed on the vehicle upon expiration of a predefined duration having started just after the imposed acceleration;
- in the method, it is possible to use a predefined duration which is between 0.5 seconds and ten seconds;
- in the method, the other acceleration phase can be imposed on the vehicle until a speed equal to the speed set point is obtained after the driver has imposed acceleration during the deceleration phase, by pressing an accelerator pedal of the vehicle;
- in the method, the other acceleration phase can be imposed on the vehicle in question until a speed greater than or equal to a maximum speed calculated to comfortably pass on a curve portion taken is obtained;
- in its step the method, when the driver selects a new speed set point during the deceleration phase, the deceleration phase can be continued and then another acceleration phase can be imposed on the vehicle until a speed equal to this new speed set point is obtained;
- in the method, the acceleration phase can be imposed either just after the deceleration phase, or after allowing a predefined duration to pass at the end of the deceleration phase, or when the radius of curvature of the future position that the vehicle is preparing to take becomes high enough to allow a new phase of acceleration.

A computer program product is also proposed which comprises a set of instructions which, when executed by processor, is suitable for implementing a speed regulation method of the type disclosed above to regulate the speed of an at least partially self-driving vehicle which knows the radius of curvature of a future position that it is preparing to take in a traffic lane along which it is traveling.

A speed regulation device is also proposed which, on the one hand, is intended to equip an at least partially self-driving vehicle which knows the radius of curvature of a future position that it is preparing to take in a traffic lane along which it is traveling, and, on the other hand, comprising at least one computer controlling the regulation of the speed of the vehicle as a function of a speed set point, and, if a radius of curvature of the future position which is representative of a curve is detected, controls the imposition on the vehicle of a deceleration phase down to a selected speed followed by an acceleration phase until a speed equal to the speed set point is obtained (possibly adapted according to the speed of another vehicle located in front of the one in question or if there is no new curve).

This speed regulation device is characterized by the fact that, when a driver of the vehicle imposes an acceleration on the vehicle during the deceleration phase, its computer controls the halting of this deceleration phase and then the imposition on the vehicle of another acceleration phase until a speed equal to the speed set point is obtained (possibly adapted according to the speed of another vehicle located in front of the one in question or if there is no new curve).

A vehicle, such as an automobile, is also proposed which is at least partially self-driving, and adapted to know the radius of curvature of a future position that the vehicle is preparing to take in a traffic lane along which it is traveling, and which comprises a speed regulation device of the type presented above.

BRIEF DESCRIPTION OF THE FIGURES

Other features and advantages of the invention will become apparent on examination of the detailed description that follows and from the drawings, in which.

DETAILED DESCRIPTION OF THE INVENTION

A speed regulation method and an associated speed regulation device DR are proposed which are intended to allow the speed regulation of an at least partially self-driving (autonomous) vehicle V, especially in the presence of a curve.

Figure 1:
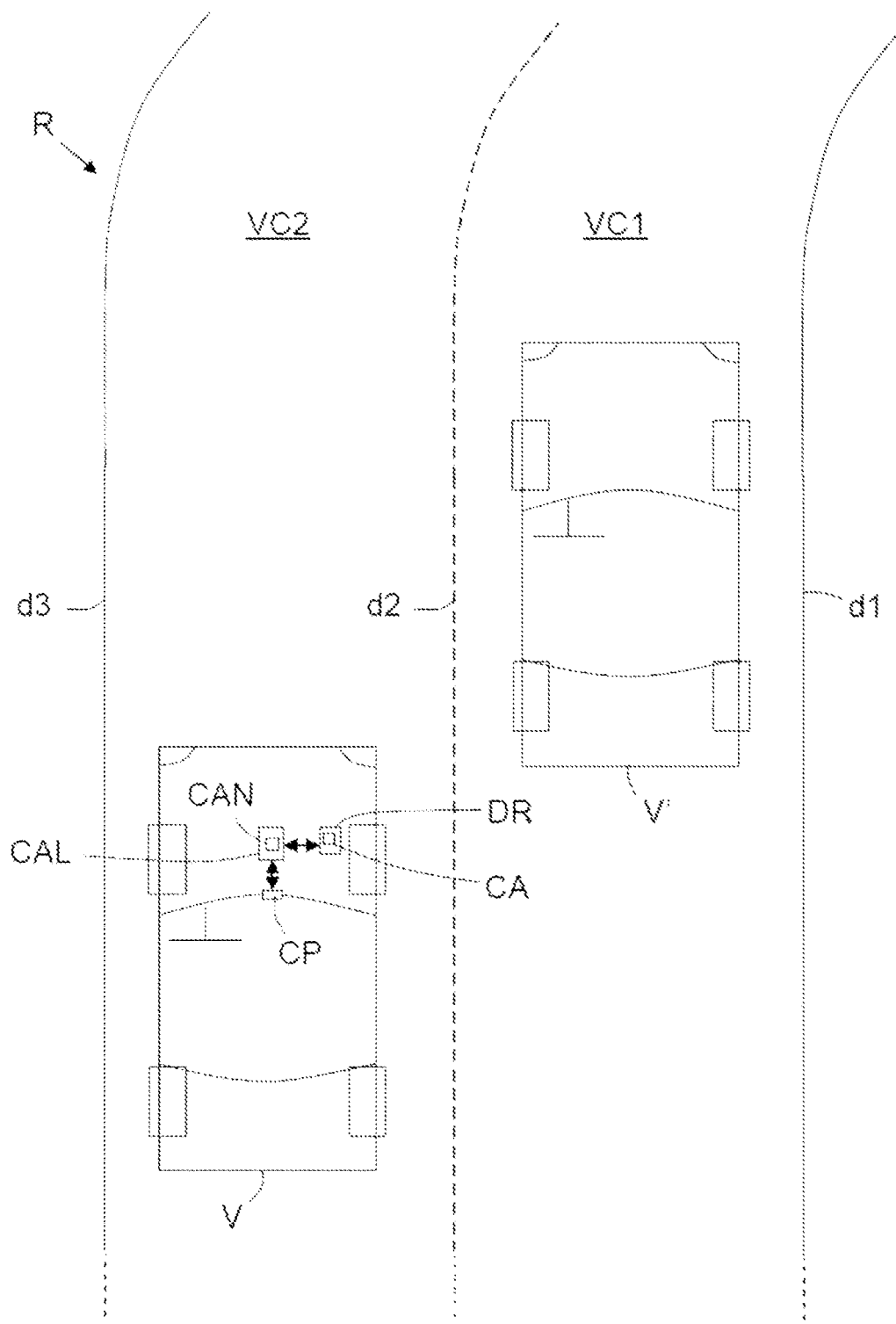
FIG. 1 schematically and functionally illustrates a vehicle located on one of the two traffic lanes of a road and equipped with a sensor, analysis circuits and an embodiment of a speed regulation device, and FIG. 2 schematically illustrates, within a diagram, a first curve (c1) of temporal evolution of the speed of a vehicle subject to speed regulation with deceleration in a curve, and a second curve (c2) of temporal evolution of the speed of the same vehicle in this same curve in the event of acceleration imposed by the driver during the deceleration phase, and FIG. 3 schematically illustrates an example of an algorithm implementing a speed regulation method.

In the following, and by way of a non-limiting example, the vehicle V is considered to be an automobile. This is for example a car, as illustrated in FIG. 1. However, the method is not limited to this type of vehicle. Indeed, the method relates to any type of at least partially self-driving terrestrial vehicle that can travel in terrestrial traffic lanes.

FIG. 1 schematically and functionally shows a road R comprising a first traffic lane VC1 and a second traffic lane VC2 along which two vehicles V' and V, respectively, travel. The first traffic lane VC1 is defined (or delimited) by two demarcations d1 and d2, and the second traffic lane VC1 is defined (or delimited) by two demarcations d2 and d3. Furthermore, in this FIG. 1, the vehicle V' is traveling along the first traffic lane VC1, while the vehicle V is traveling along the second traffic lane VC2 in order to overtake (or pass) the vehicle V'.

The vehicle V comprises at least one speed regulation device DR. In the example illustrated in a non-limiting manner in FIG. 1, the vehicle V also optionally comprises a sensor CP and analysis circuits CAN which will be explained below.

It should be noted that for the method to be able to be implemented, the vehicle V must know at all times the radii of curvature of the position of the second traffic lane VC2 on which it is traveling and of the future position it is preparing to take on this second traffic lane VC2 along which it is traveling. This knowledge can result from an analysis of the environment, or from road information defining each portion of the road R taken (and in particular its radius of curvature (or its inverse, namely the curvature)), or from an analysis of the coordinates (for example GPS) of the road R.

The analysis of the environment can, for example, result from the (permanent) presence in the vehicle V of at least one sensor CP and of analysis circuits CAN, as illustrated in a non-limiting manner in FIG. 1.

This sensor CP comprises at least one digital camera installed in a front part of the vehicle (for example on the windshield or on the interior rearview mirror), and which is responsible for acquiring digital images in the environment which is at least located in front of the vehicle V (as well as possibly on part of the two lateral sides of the vehicle V).

It should be noted that the number of sensors CP here is equal to one (1), but it can take any value greater than or equal to one (1) (at least one sensor on the front), as long as this makes it possible to acquire data about the environment which is at least in front of the vehicle V. Thus, the vehicle V could also comprise at least one ultrasonic sensor, or at least one radar or lidar, or at least one other camera installed in a rear part and/or cameras installed on its two lateral sides.

The analysis circuits CAN are arranged so as to analyze at least the digital images acquired by the sensor CP in the environment situated at least in front of the vehicle V, in order to determine data which are representative at least of the second traffic lane VC2 along which the vehicle V travels temporarily. For example, these environmental data define at least the radius of curvature (or the curvature) of the positions of the two demarcations d2 and d3 of the second traffic lane VC2 that the vehicle V is preparing to take. It should be noted that these environmental data can also define the heading of the vehicle V, and/or the estimate of the derivative of the radius of curvature, and/or the width of a demarcation, and/or the distance separating two demarcations (here d2 and d3), for example.

In the example illustrated in a non-limiting manner in FIG. 1, the analysis circuits CAN form part of a computer CAL on board the vehicle V. However, this is not mandatory. Indeed, the analysis circuits CAN could comprise their own computer. Consequently, the analysis circuits CAN can be produced in the form of a combination of electrical or electronic circuits or components (or hardware) and software (or computer) modules.

The road information (defining each portion of the road R taken) can come from a database defining a very precise road map on board the vehicle V or else accessible via electromagnetic, or air, waves by the vehicle V. In this case, the geographical position of the future position that the vehicle V is preparing to take along the second traffic lane VC2 is precisely determined, for example by means of an on-board navigation assistance device (possibly temporarily) in the vehicle V, then the radius of curvature (or the curvature) which is associated with this future position is determined in the database.

In the absence of a sensor CP but in the presence of coordinates (for example GPS) of the road R, the analysis circuits CAN are arranged so as to analyze these coordinates in order to determine the environmental data which define at least the radius of curvature (or the curvature) of the portions of the two demarcations d2 and d3 of the second traffic lane VC2 that the vehicle V is preparing to take. These coordinates of the road R can, for example, be provided by an on-board navigation assistance device (possibly temporarily) in the vehicle V.

As mentioned above, a speed regulation method intended to allow the automated regulation of the speed of the vehicle V is proposed.

This method (of speed regulation) can be at least partially implemented by the (speed) regulation device DR, which for this purpose comprises at least one computer CA. The computer CA can, for example, comprise at least one digital signal processor (or DSP), optionally associated with at least one memory.

It should be noted that this regulation device DR can be an ADAS ("Advanced Driver Assistance System").

It should also be noted that the computer CA can optionally perform at least one function within the vehicle V other than that which is the object of the invention. Thus, it could, for example, comprise any analysis circuits CAN.

The assistance method comprises steps 10-90 in which the first step is to regulate the speed of the vehicle V as a function of a speed set point cv (and possibly of another vehicle located in front of the vehicle V in question). This regulation is controlled by the computer CA by means of commands which it determines for components of the vehicle V which are involved in the movements of the vehicle V, such as for example the powertrain, the braking system, and the gear changing means (for example an automatic gearbox).

It should be noted that the speed set point cv can be chosen either by the driver of the vehicle V, or by a device on board the vehicle V, for example as a function of a speed limit imposed on the portion of the road R taken.

Then, during the steps 10-90, if a radius of curvature of the future position (which the vehicle V is preparing to take (at least) along the second traffic lane VC2) which is representative of a curve is detected, a deceleration phase is imposed on the vehicle V down to a chosen speed vd. This chosen speed vd is determined so that the vehicle V comfortably passes the taken curve portion. Then, once this chosen speed vd has been reached by the vehicle V, an acceleration phase (hereinafter referred to as acceleration phase no. 1) is imposed on the vehicle V until a speed equal to the speed set point cv is obtained (possibly adapted according to the speed of another vehicle located in front of the vehicle V being controlled or if there is no new curve).

It should be understood that it is the computer CA which detects whether the radius of curvature of the future position is representative of a curve, and which controls the imposition of the deceleration phase followed by the acceleration phase no. 1 on the vehicle V.

It should be noted that acceleration phase no. 1 can be imposed just after the deceleration phase, or after having allowed a predefined duration to pass at the end of the deceleration phase, or when the radius of curvature of the future position that the vehicle is preparing to take becomes high enough to allow a new acceleration phase.

Figure 2:
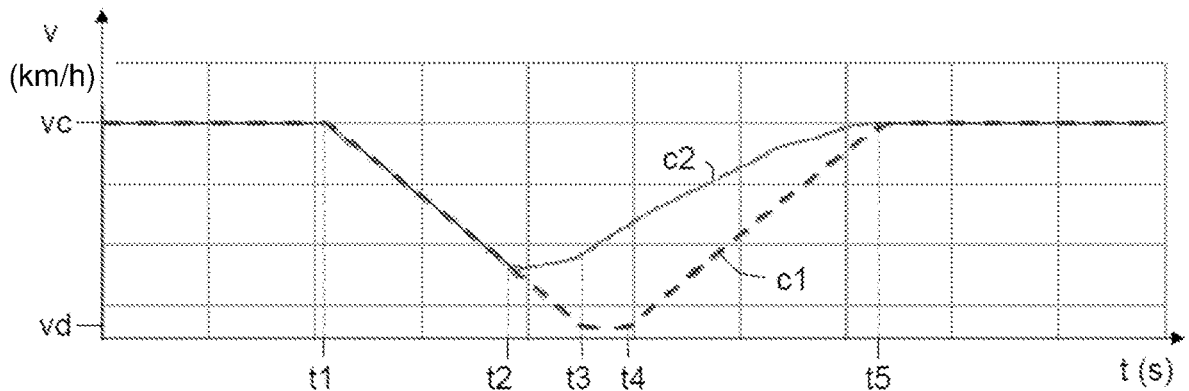

FIG. 2 schematically illustrates, within a diagram, a first curve c1 of temporal evolution (t in seconds) of the speed v (in km/h) of the vehicle V during speed regulation with deceleration in a curve. In this purely illustrative example, before the instant t1, the speed of the vehicle V is regulated to the speed set point cv by the regulation device DR. Then at this instant t1, the regulation device DR detects an upcoming (or future) curve in front of the vehicle V, and therefore imposes a deceleration phase on the vehicle V down to a chosen speed vd. The chosen speed vd is reached at an instant t3. Then, at an instant t4 (which may be substantially equal to t3), the regulation device DR imposes the acceleration phase no. 1 on the vehicle V until a speed equal to the speed set point cv is obtained. The set point cv is reached here at an instant t5. The speed regulation to the speed set point cv is therefore carried out again after this instant t5 (until a next curve is detected).

It should be noted that the difference between the speed set point cv and the chosen speed vd preferably varies as a function of the speed set point cv. However, it could also be predefined, and therefore constant. By way of example, when the speed set point cv is equal to approximately 120 km/h (~75 mph), the chosen speed vd can be between 100 km/h (~62 mph) and 110 km/h (~68 mph). The driver of the vehicle V can optionally choose the law of variation of the difference (cv−vd) as a function of cv.

In step 10-90, when the driver of the vehicle V imposes an acceleration on the vehicle V during the deceleration phase (imposed following the detection of an upcoming curve), this deceleration phase is halted, then another acceleration phase (hereinafter referred to as acceleration phase no. 2) is imposed on the vehicle V until a speed equal to the speed set point cv is obtained (possibly adapted according to the speed of another vehicle located in front of the vehicle V in question or if there is no new curve).

In other words, after this imposed acceleration is detected, the traditional regulation in curves (consisting in ending the deceleration phase previously initiated, then in imposing acceleration phase no. 1) is no longer resumed, but rather the deceleration is halted and instead an acceleration phase no. 2 is imposed so that the vehicle V regains its speed set point cv (possibly adapted according to the speed of another vehicle located in front of the vehicle V in question or if it there is no new curve). The driver's wishes are thus incorporated, namely the desire not to see the speed of his vehicle V drop to the chosen speed vd at the end of the deceleration phase, for example here because he wishes, in the upcoming curve, to continue the current passing of the vehicle V' traveling along the first traffic lane VC1. In addition, this helps prevent a slowdown in the flow of traffic (here along the second traffic lane VC2), which contributes to the peace of mind of the drivers of vehicles following the vehicle V and to the safety of road R users.

FIG. 2 schematically illustrates, within the diagram, a second curve c2 of temporal evolution (t in seconds) of the speed v (in km/h) of the vehicle V in the event of acceleration imposed by the driver during the deceleration phase in the same curve as that concerned by the first curve c1 described above. In this purely illustrative example, the deceleration phase down to the chosen speed vd began at the instant t1, and at an instant t2 prior to the instant t3 the driver of the vehicle V imposes an acceleration on the vehicle V up to an instant which here is substantially the instant t3. Then, at this instant t3 (but it could be a little bit later, as will be explained below), the regulation device DR imposes the other acceleration phase no. 2 on the vehicle V until a speed equal to the speed set point cv is obtained. The speed set point cv is reached here at the instant t5. The speed regulation to the speed set point cv is therefore carried out again after this instant t5 (until a next curve is detected).

For example, in steps 10-90, it is possible to impose the other acceleration phase no. 2 on the vehicle V upon the expiration of a predefined period having started just after the acceleration imposed during the deceleration phase. In this case, the computer CA can, for example, use a predefined duration which is between 0.5 seconds and ten seconds. But in a variant, the computer CA could impose the other acceleration phase no. 2 on the vehicle V just after the detection of the end of the imposed acceleration like in the example of the curve c2 in FIG. 2.

It should be noted that in steps 10-90, the other acceleration phase no. 2 can be imposed on the vehicle V (until a speed equal to the speed set point cv is obtained) after the driver has imposed acceleration during deceleration, by pressing the accelerator pedal (or the like) of the vehicle V.

It should also be noted that in steps 10-90, the other acceleration phase no. 2 can be imposed on the vehicle V until a speed greater than or equal to a maximum speed calculated to comfortably pass the curve portion taken is obtained.

It should also be noted that in steps 10-90, when the driver selects a new speed set point cv' during the deceleration phase, the latter can be continued, then another acceleration phase (hereinafter referred to as no. 3) can be imposed on the vehicle V until a speed equal to this new speed set point cv' is obtained. In other words, in the presence of this option, the selection of a new speed set point cv' is not considered by the computer CA as a wish on the part of the driver to interrupt the deceleration phase, but only as the wish for the next acceleration phase no. 3 to end when the speed of the vehicle V has become equal to the new speed set point cv'. This last option preferably requires that the new speed set point cv' is greater than a minimum speed.

Figure 3:
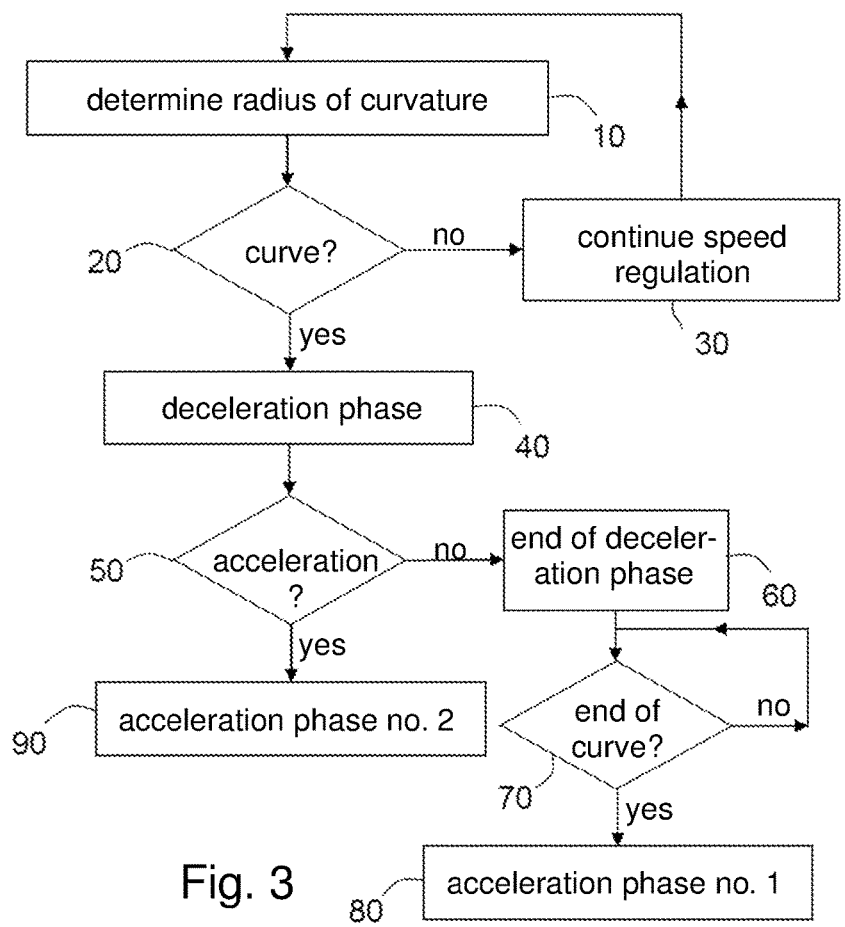

An example of an algorithm implementing the step of the assistance method described above is schematically illustrated in FIG. 3.

In a first sub-step 10, while the computer CA is regulating the speed of the vehicle V to the speed set point cv it determines the radius of curvature of the future position (which the vehicle V is preparing to take along the second traffic lane VC2).

Then, in a second sub-step 20, the computer CA determines whether this radius of curvature is representative of a curve. If not ("no"), the computer CA normally continues the speed regulation at the speed set point cv, in a third sub-step 30, and carries out the first sub-step 10 again. Conversely, if yes ("yes"), the computer CA imposes on the vehicle V, in a fourth sub-step 40, a deceleration phase to a chosen speed vd.

Then, in a fifth sub-step 50, the computer CA determines whether the driver of the vehicle V has just imposed an acceleration on the vehicle V during the deceleration phase.

If not ("no"), the computer CA ends the current deceleration phase in a sixth sub-step 60. Then, the computer CA can, for example, determine, in a seventh sub-step 70, whether the vehicle V has exited the curve. If not ("no"), the computer CA can carry out the seventh sub-step 70 again. Conversely, if yes ("yes"), the computer CA imposes acceleration phase no. 1 on the vehicle V in an eighth sub-step 80. Then, the computer CA will resume normal speed regulation (excluding curves), at the speed set point cv, and therefore the computer CA will perform the first sub-step 10 again.

Conversely, if the determination carried out in the fifth sub-step 50 (and therefore in the affirmative) indicates that the driver has just imposed an acceleration, the computer CA halts the current deceleration phase, then acceleration phase no. 2 is imposed on the vehicle V in a ninth sub-step 90. Then, the computer CA will resume normal speed regulation (excluding curves), at the speed set point cv (possibly adapted according to the speed of another vehicle located in front of the vehicle V being controlled), and therefore the computer CA will perform the first sub-step 10 again.

It should be noted that a computer program product is proposed comprising a set of instructions which, when executed by processing means such as electronic circuits (or hardware), for example the computer CA, is capable of implementing the speed regulation method described above in order to regulate the speed of the vehicle V.

It should also be noted that in FIG. 1, the regulation device DR is very schematically illustrated with only its computer CA. This regulation device DR can take the form of a box comprising integrated (or printed) circuits, or of a plurality of integrated (or printed) circuits connected by wired or non-wired connections. An integrated (or printed) circuit is understood to mean any type of device capable of performing at least one electrical or electronic operation. As mentioned above, this regulation device DR can comprise at least one processor, for example a digital signal processor (or DSP), a random access memory for storing instructions for the implementation by this processor of the speed regulation method as described above, and auxiliary storage in particular for storing the environmental data obtained, and any intermediate data involved in all the calculations. The computer CA receives at least the environmental data for use in calculations, possibly after having edited and/or demodulated and/or amplified them, in a manner known per se. The regulation device DR can also comprise an input interface for receiving at least the environmental data, and an output interface for the transmission of the results of its calculations, and in particular the speed regulation commands.

One or more sub-steps of the speed regulation method step can be performed by different components. Thus, the speed regulation method can be implemented by a plurality of processors, random access memory, auxiliary storage, input interface, output interface and/or digital signal processor. In these situations, the regulation device DR can be decentralized, within a local network (a plurality of processors linked together for example) or a wide-area network.

The invention claimed is:

1. A method of regulating the speed of an at least partially self-driving vehicle, knowing the radius of curvature of a future position the vehicle is preparing to take in a traffic lane along which the vehicle is traveling, said method comprising a step in which the speed of said vehicle is regulated as a function of a speed set point, and, if a radius of curvature of said future position is detected which is representative of a curve, a deceleration phase down to a chosen speed followed by an acceleration phase until a speed equal to said speed set point is obtained are imposed on said vehicle by a speed regulator, wherein in said step, when a driver of said vehicle imposes an acceleration on the vehicle during said deceleration phase, said deceleration phase is halted and then another acceleration phase is imposed on said vehicle until a speed equal to said speed set point is obtained; and wherein in said step, when said driver selects a new speed set point during said deceleration phase, the deceleration phase is continued, then another acceleration phase is imposed on said vehicle until a speed equal to said new speed set point is obtained.

2. The method according to claim 1, wherein in said step, said other acceleration phase is imposed on said vehicle upon expiration of a predefined duration starting just after said imposed acceleration.

3. The method according to claim 1, wherein in said step, said other acceleration phase is imposed on said vehicle until a speed greater than or equal to a maximum speed calculated to comfortably pass a curve portion taken is obtained.

4. The method according to claim 1, wherein in said step, said other acceleration phase is imposed on said vehicle until a speed equal to said speed set point is obtained after the driver has imposed acceleration during said deceleration phase, by pressing an accelerator pedal of said vehicle.

5. A method of regulating the speed of an at least partially self-driving vehicle, knowing the radius of curvature of a future position the vehicle is preparing to take in a traffic lane along which the vehicle is traveling, said method comprising a step in which the speed of said vehicle is regulated as a function of a speed set point, and, if a radius of curvature of said future position is detected which is representative of a curve, a deceleration phase down to a chosen speed followed by an acceleration phase until a speed equal to said speed set point is obtained are imposed on said vehicle by a speed regulator, wherein in said step, when a driver of said vehicle imposes an acceleration on the vehicle during said deceleration phase, said deceleration phase is halted and then another acceleration phase is imposed on said vehicle until a speed equal to said speed set point is obtained; and wherein in said step said acceleration phase is imposed just after the deceleration phase, or after allowing a predefined duration to pass at the end of said deceleration phase, or when the radius of curvature of the future position that said vehicle is preparing to take becomes large enough to allow a new phase of acceleration.

6. The method according to claim 5, wherein in said step, said other acceleration phase is imposed on said vehicle upon expiration of a predefined duration starting just after said imposed acceleration.

7. The method according to claim 5, wherein in said step, said other acceleration phase is imposed on said vehicle until a speed greater than or equal to a maximum speed calculated to comfortably pass a curve portion taken is obtained.

8. The method according to claim 5, wherein in said step, said other acceleration phase is imposed on said vehicle until a speed equal to said speed set point is obtained after the driver has imposed acceleration during said deceleration phase, by pressing an accelerator pedal of said vehicle.

9. A device for regulating the speed of an at least partially self-driving vehicle, knowing the radius of curvature of a future position it is preparing to take in a traffic lane along which it is traveling, said device comprising at least one computer controlling the regulation of the speed of said vehicle as a function of a speed set point, and, if a radius of curvature of said future position is detected which is representative of a curve, controlling the imposition on said vehicle of a deceleration phase down to a chosen speed followed by an acceleration phase until a speed equal to said speed set point is obtained, wherein when a driver of said vehicle imposes an acceleration on the latter during said deceleration phase, said computer controls the halting of said deceleration phase and then the imposition on said vehicle of another acceleration phase until a speed equal to said speed set point is obtained;

wherein, when said driver selects a new speed set point during said deceleration phase, the deceleration phase is continued, then another acceleration phase is imposed on said vehicle until a speed equal to said new speed set point is obtained; or wherein said acceleration phase is imposed just after the deceleration phase, or after allowing a predefined duration to pass at the end of said deceleration phase, or when the radius of curvature of the future position that said vehicle is preparing to take becomes large enough to allow a new phase of acceleration.

10. A vehicle which is at least partially self-driving, knowing a radius of curvature of a future position that the vehicle is preparing to take in a traffic lane along which it is traveling, wherein the vehicle comprises a speed regulation device according to claim 9.

11. The vehicle according to claim 10, wherein said vehicle is an automobile.

\* \* \* \* \*